US012688069B2

(12) United States Patent
Venuturumilli et al.

(10) Patent No.: US 12,688,069 B2
(45) Date of Patent: Jul. 21, 2026

(54) SYSTEMS AND METHODS FOR SECURED AND INTEGRATED ANALYTICS DEPLOYMENT ACCELERATOR

(71) Applicant: Honeywell International Inc., Charlotte, NC (US)

(72) Inventors: Rakesh Venuturumilli, Tempe, AZ (US); Srinivasu Nalam, Cumming, GA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 707 days.

(21) Appl. No.: 17/934,306

(22) Filed: Sep. 22, 2022

(65) Prior Publication Data

US 2024/0103921 A1     Mar. 28, 2024

(51) Int. Cl.
G06F 9/50 (2006.01)
G06F 8/61 (2018.01)
G06F 21/62 (2013.01)

(52) U.S. Cl.
CPC .............. G06F 9/5038 (2013.01); G06F 8/63 (2013.01); G06F 9/5077 (2013.01); G06F 21/6209 (2013.01); G06F 2209/505 (2013.01); G06F 2221/2125 (2013.01)

(58) Field of Classification Search
CPC ........ G06F 9/5038; G06F 8/63; G06F 9/5077; G06F 21/6209; G06F 2209/505; G06F 2221/2125
See application file for complete search history.

(56) References Cited

U.S. PATENT DOCUMENTS

| | | | | |
|---|---|---|---|---|
| 9,983,891 | B1 * | 5/2018 | Christensen | G06F 8/63 |
| 10,552,135 | B1 * | 2/2020 | Gershnik | G06F 8/61 |
| 10,877,739 | B1 * | 12/2020 | Fernandez | G06F 9/455 |
| 11,444,785 | B2 * | 9/2022 | Vaddi | H04L 9/321 |
| 11,487,591 | B1 * | 11/2022 | Featonby | G06F 9/45558 |
| 11,822,654 | B2 * | 11/2023 | Goldstein | G06F 21/566 |

(Continued)

OTHER PUBLICATIONS

Marius Popa; "Techniques of program code obfuscation for secure software"; Journal of Mobile, Embedded and Distributed system, Vo. III, No. 4, 2011; (Popa_2011.pdf) (Year: 2011).*

(Continued)

*Primary Examiner* — Hiren P Patel
(74) *Attorney, Agent, or Firm* — ALSTON & BIRD LLP

(57)     ABSTRACT

Disclosed are methods and systems for securely deploying obfuscated modules in an external system. For instance, a method may include selecting one or more modules from a module repository, the one or more modules associated with completing a task, receiving a custom base image, the custom base image including one or more environment modules configured to provide a specific execution environment for the one or more modules, transforming based on the custom base image, the one or more modules into a container image, the transforming including performing at least one obfuscation action on the one or more modules, and publishing the container image and a container image identifier to the external system, the external system configured to execute a cluster instance corresponding to the task, the cluster instance comprising at least one of: the container image identifier, one or more environmental parameters, and one or more entry point parameters.

20 Claims, 5 Drawing Sheets

400

SELECTING, BY ONE OR MORE PROCESSORS, ONE OR MORE MODULES FROM A MODULE REPOSITORY, THE ONE OR MORE MODULES ASSOCIATED WITH COMPLETING A TASK — 402

RECEIVING, BY THE ONE OR MORE PROCESSORS, A CUSTOM BASE IMAGE, THE CUSTOM BASE IMAGE INCLUDING ONE OR MORE ENVIRONMENT MODULES CONFIGURED TO PROVIDE A SPECIFIC EXECUTION ENVIRONMENT FOR THE ONE OR MORE MODULES — 404

TRANSFORMING, BY THE ONE OR MORE PROCESSORS, BASED ON THE CUSTOM BASE IMAGE, THE ONE OR MORE MODULES INTO A CONTAINER IMAGE, THE TRANSFORMING INCLUDING PERFORMING AT LEAST ONE OBFUSCATION ACTION ON THE ONE OR MORE MODULES — 406

PUBLISHING, BY THE ONE OR MORE PROCESSORS, THE CONTAINER IMAGE AND A CONTAINER IMAGE IDENTIFIER TO THE EXTERNAL SYSTEM, THE EXTERNAL SYSTEM CONFIGURED TO EXECUTE A CLUSTER INSTANCE CORRESPONDING TO THE TASK, THE CLUSTER INSTANCE COMPRISING AT LEAST ONE OF: THE CONTAINER IMAGE IDENTIFIER, ONE OR MORE ENVIRONMENTAL PARAMETERS INDICATIVE OF AN ENVIRONMENT TO EXECUTE THE CONTAINER IMAGE, AND ONE OR MORE ENTRY POINT PARAMETERS INDICATIVE OF AN INITIAL CONFIGURATION FOR EXECUTING THE CONTAINER IMAGE — 408

(56)             References Cited

U.S. PATENT DOCUMENTS

| | | | |
|---|---|---|---|
| 12,346,098 B2 * | 7/2025 | Gau | G06Q 10/06 |
| 2006/0147110 A1 * | 7/2006 | Munsil | H04N 1/4053 |
| | | | 382/162 |
| 2013/0232497 A1 * | 9/2013 | Jalagam | G06F 9/5072 |
| | | | 718/104 |
| 2015/0142878 A1 * | 5/2015 | Hebert | H04L 67/10 |
| | | | 709/203 |
| 2018/0167487 A1 * | 6/2018 | Vyas | G06F 9/5027 |
| 2018/0278639 A1 * | 9/2018 | Bernstein | G06F 21/53 |
| 2019/0095253 A1 * | 3/2019 | Curtis | H04L 67/34 |
| 2019/0235861 A1 * | 8/2019 | Suarez | G06F 9/45558 |
| 2019/0265066 A1 * | 8/2019 | Kershaw | B60K 35/28 |
| 2019/0272162 A1 * | 9/2019 | Couillard | G06F 21/125 |
| 2020/0073739 A1 * | 3/2020 | Rungta | G06F 8/60 |
| 2021/0218559 A1 * | 7/2021 | Xia | H04L 9/0825 |
| 2022/0188444 A1 * | 6/2022 | Stoler | H04L 9/006 |
| 2024/0004686 A1 * | 1/2024 | Brezak | G06F 9/44505 |

OTHER PUBLICATIONS

Azab et al.; "Software Provisioning Inside a Secure Environment as Docker Containers using STROLL File-system"; 2016 16th IEEE/ACM International symposium on Cluster, Cloud, and Grid computing; (Azab_2016.pdf) (Year: 2016).*

* cited by examiner

400

402

SELECTING, BY ONE OR MORE PROCESSORS, ONE OR MORE MODULES FROM A MODULE REPOSITORY, THE ONE OR MORE MODULES ASSOCIATED WITH COMPLETING A TASK

404

RECEIVING, BY THE ONE OR MORE PROCESSORS, A CUSTOM BASE IMAGE, THE CUSTOM BASE IMAGE INCLUDING ONE OR MORE ENVIRONMENT MODULES CONFIGURED TO PROVIDE A SPECIFIC EXECUTION ENVIRONMENT FOR THE ONE OR MORE MODULES

406

TRANSFORMING, BY THE ONE OR MORE PROCESSORS, BASED ON THE CUSTOM BASE IMAGE, THE ONE OR MORE MODULES INTO A CONTAINER IMAGE, THE TRANSFORMING INCLUDING PERFORMING AT LEAST ONE OBFUSCATION ACTION ON THE ONE OR MORE MODULES

408

PUBLISHING, BY THE ONE OR MORE PROCESSORS, THE CONTAINER IMAGE AND A CONTAINER IMAGE IDENTIFIER TO THE EXTERNAL SYSTEM, THE EXTERNAL SYSTEM CONFIGURED TO EXECUTE A CLUSTER INSTANCE CORRESPONDING TO THE TASK, THE CLUSTER INSTANCE COMPRISING AT LEAST ONE OF: THE CONTAINER IMAGE IDENTIFIER, ONE OR MORE ENVIRONMENTAL PARAMETERS INDICATIVE OF AN ENVIRONMENT TO EXECUTE THE CONTAINER IMAGE, AND ONE OR MORE ENTRY POINT PARAMETERS INDICATIVE OF AN INITIAL CONFIGURATION FOR EXECUTING THE CONTAINER IMAGE

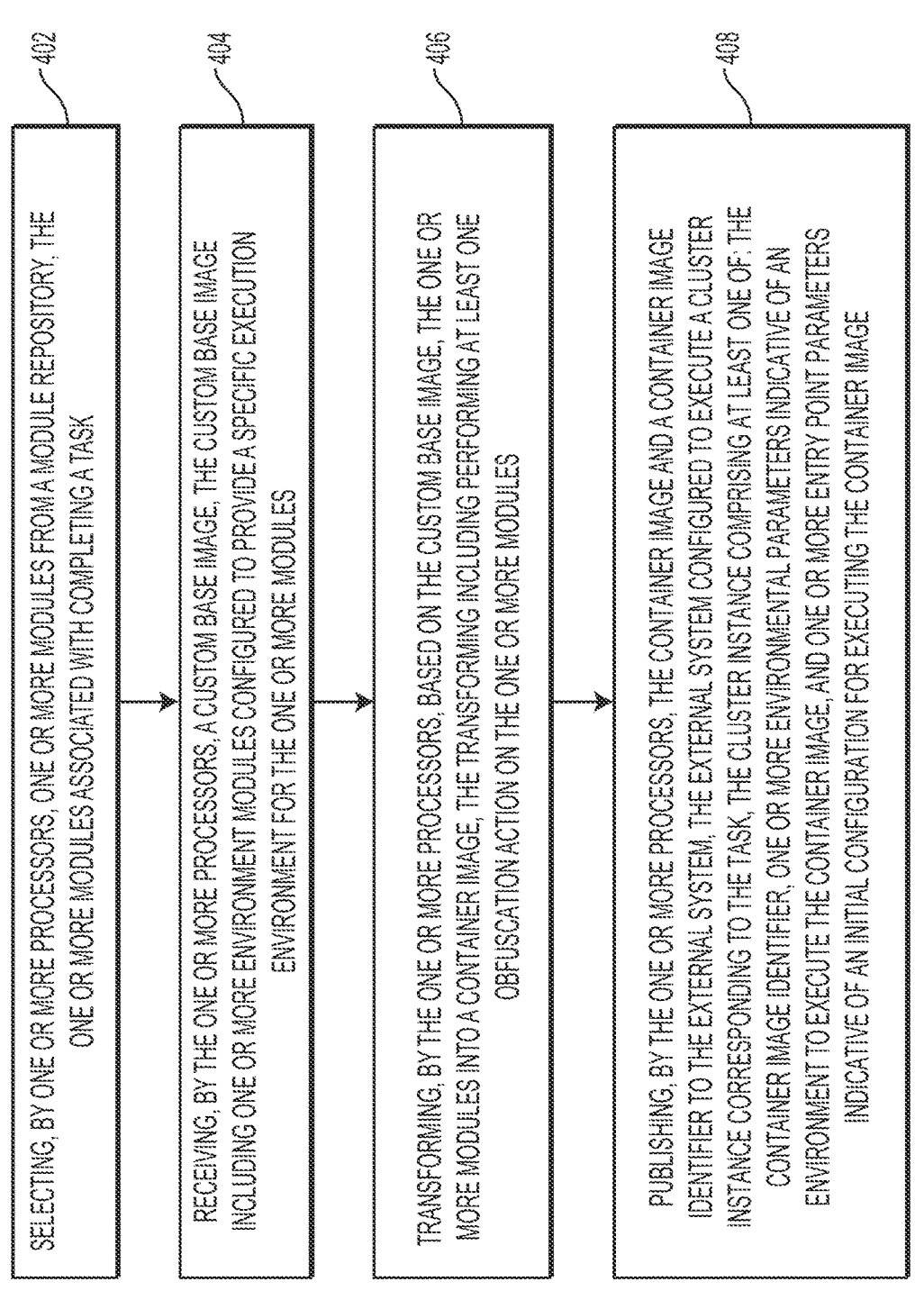

*FIG. 4*

SYSTEMS AND METHODS FOR SECURED AND INTEGRATED ANALYTICS DEPLOYMENT ACCELERATOR

TECHNICAL FIELD

Various embodiments of the present disclosure relate generally to securely deploying obfuscated executable modules and, more particularly, to systems and methods for securely deploying obfuscated modules in an external system.

BACKGROUND

Demand has grown for pipelines that may securely host an internal system's executables and resources inside of a private network, run scanning and security tools on the executables, and then deploy the executables as obfuscated executables on an external system. Such pipelines may provide, among other things, secure executables, as well as a more user-friendly external system process.

More generally, under current approaches, external systems may manually initiate, via a user, executables to run in order to complete jobs for the system. Additionally, the contents of the executables may be accessible by the external system. Additionally, the external system may need to perform testing on the executables, which may be inefficient, time consuming, and overwhelming for the external user.

This disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for securely deploying obfuscated executable modules in an external system.

In one aspect, an exemplary embodiment of a method for securely deploying obfuscated modules in an external system is disclosed. The method may include selecting, by one or more processors, one or more modules from a module repository, the one or more modules associated with completing a task. The method may further include receiving, by the one or more processors, a custom base image, the custom base image including one or more environment modules configured to provide a specific execution environment for the one or more modules. The method may further include transforming, by the one or more processors, based on the custom base image, the one or more modules into a container image, the transforming including performing at least one obfuscation action on the one or more modules. The method may further include publishing, by the one or more processors, the container image and a container image identifier to the external system, the external system configured to execute a cluster instance corresponding to the task, the cluster instance comprising at least one of: the container image identifier, one or more environmental parameters indicative of an environment to execute the container image, and one or more entry point parameters indicative of an initial configuration for executing the container image.

In one aspect, a computer system for securely deploying obfuscated modules in an external system is disclosed. The computer system may include a memory having processor-readable instructions stored therein, and one or more processors configured to access the memory and execute the processor-readable instructions, which when executed by the one or more processors configures the one or more processors to perform a plurality of functions. The functions may include selecting one or more modules from a module repository, the one or more modules associated with completing a task. The functions may further include receiving a custom base image, the custom base image including one or more environment modules configured to provide a specific execution environment for the one or more modules. The functions may further include transforming based on the custom base image, the one or more modules into a container image, the transforming including performing at least one obfuscation action on the one or more modules. The functions may further include publishing the container image and a container image identifier to the external system, the external system configured to execute a cluster instance corresponding to the task, the cluster instance comprising at least one of: the container image identifier, one or more environmental parameters indicative of an environment to execute the container image, and one or more entry point parameters indicative of an initial configuration for executing the container image.

In one aspect, a non-transitory computer-readable medium containing instructions for securely deploying obfuscated modules in an external system is disclosed. The instructions may include selecting one or more modules from a module repository, the one or more modules associated with completing a task. The instructions may further include receiving a custom base image, the custom base image including one or more environment modules configured to provide a specific execution environment for the one or more modules. The instructions may further include transforming based on the custom base image, the one or more modules into a container image, the transforming including performing at least one obfuscation action on the one or more modules. The instructions may further include publishing the container image and a container image identifier to the external system, the external system configured to execute a cluster instance corresponding to the task, the cluster instance comprising at least one of: the container image identifier, one or more environmental parameters indicative of an environment to execute the container image, and one or more entry point parameters indicative of an initial configuration for executing the container image.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4 depicts a flowchart of an exemplary method for securely deploying obfuscated modules in an external system, according to one or more embodiments.

DETAILED DESCRIPTION OF EMBODIMENTS

Figure 1:
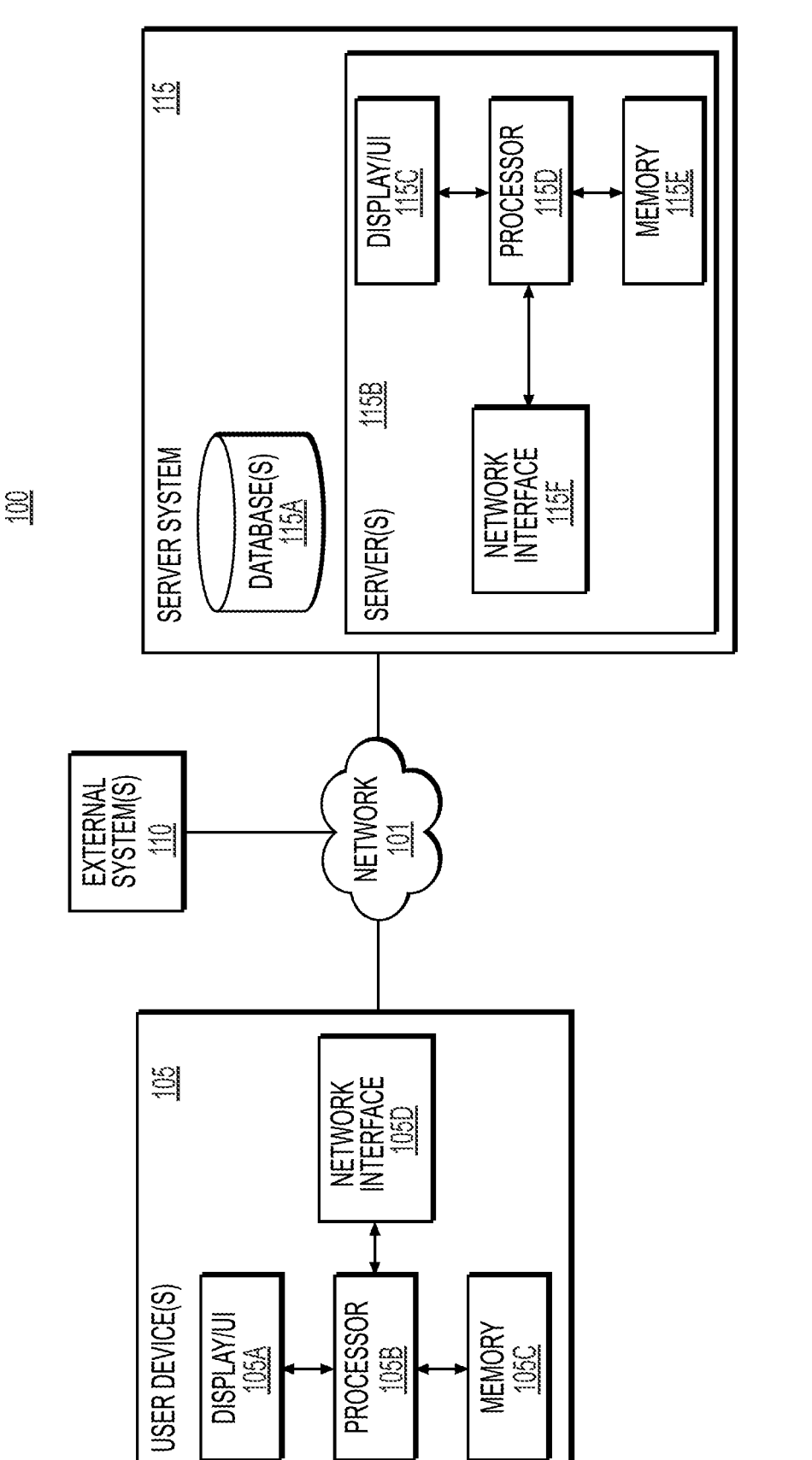
FIG. 1 depicts an exemplary environment that may be utilized with techniques presented herein, according to one or more embodiments.

According to certain aspects of the disclosure, methods and systems are disclosed for securely deploying obfuscated executable modules in an external system. Conventional techniques may not be suitable because conventional techniques do not allow for executables to be obfuscated before deployment to external systems. Additionally, conventional techniques may not allow for the customization of the build environment of the executables. Accordingly, improvements in technology relating to securely deploying obfuscated modules in an external system.

Demand has grown for pipelines that may securely host an internal system's executables and resources inside of a private network, run scanning and security tools on the executables, and then deploy the executables as obfuscated executables on an external system. The pipeline may provide the ability to create, build, test, obfuscate, and deploy executable modules in an internal system, and then provide the obfuscated executable module to an external system. Moreover, there is also a demand for the ability to obfuscate the executable modules so that the executable modules may be deployed in any external system, without the need for the external system to include specific tools and/or applications to support the executable module. Such pipelines may provide, among other things, secure executables, as well as a more user-friendly external system process. Additionally, a need has also grown for the executables to be stored in an on-demand manner, where the executables may be deployed whenever a job should be completed. For example, the pipeline may utilize an executable module repository, perform build packages, protect the executable modules, perform testing, and then deploy packages (e.g., container images) into a container registry of an external (or internal) system.

Advantages of such a pipeline may include protecting and encapsulating the executables and entire execution environment into a single deployable unit built on a standard image, a pipeline that may be agnostic regarding the system for deploying the executables, and/or a customizable pipeline that may accommodate new applications or specific application versions to pass industry standard security guidelines and avoid compatibility issues. Additional advantages may include reducing the build time to deploy executable modules into external systems, such as a private cloud, with a high level security process, and/or protecting the details of the executables.

Additional advantages include a pipeline that is highly productive and reusable. Such a reusable pipeline provides for a vulnerable-free docker based obfuscated analytical models into any databricks environment for both internal and external customers. Such a pipeline may securely host code/resources inside a private network, run the scanning and security tools, and then deploy the same on any external service's premise with the code obfuscated. An orchestration service may ensure that the latest executable is deployed on-demand. In addition to the benefits mentioned above, the advantages may also include the ability to add any custom layers, such as executables that run particular tests in the build agents or to build any package.

The systems and methods disclosed herein relate to securely deploying obfuscated (executable) modules in an external system. The systems and methods may include selecting one or more modules from a module repository, the one or more modules associated with completing a task. The systems and methods may further include receiving a custom base image, the custom base image including one or more environment modules configured to provide a specific execution environment for the one or more modules. The systems and methods may further include transforming based on the custom base image, the one or more modules into a container image, the transforming including performing at least one obfuscation action on the one or more modules. The systems and methods may further include publishing the container image and a container image identifier to the external system, the external system configured to execute a cluster instance corresponding to the task, the cluster instance comprising at least one of: the container image identifier, one or more environmental parameters indicative of an environment to execute the container image, and one or more entry point parameters indicative of an initial configuration for executing the container image.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±10% in a stated value. The term "exemplary" is used in the sense of "example" rather than "ideal." As used herein, the singular forms "a," "an," and "the" include plural reference unless the context dictates otherwise.

While this disclosure describes the systems and methods with reference to securely deploying obfuscated modules in an external system, it should be appreciated that the present systems and methods are applicable to securely deploying obfuscated modules in an internal system or any other system.

Exemplary Environment

FIG. 1 depicts an exemplary environment 100 that may be utilized with techniques presented herein. One or more user device(s) 105, one or more external system(s) 110, and one or more server system(s) 115 may communicate across a network 101. As will be discussed in further detail below, one or more server system(s) 115 may communicate with one or more of the other components of the environment 100 across network 101. The one or more user device(s) 105 may be associated with a user, e.g., a user associated with securely deploying obfuscated modules in an external system.

In some embodiments, the components of the environment 100 are associated with a common entity, e.g., a corporation, an institution, a network, or the like. In some embodiments, one or more of the components of the environment is associated with a different entity than another. The systems and devices of the environment 100 may communicate in any arrangement. As will be discussed herein, systems and/or devices of the environment 100 may communicate in order to securely deploy obfuscated modules in an external system, among other activities.

The user device 105 may be configured to enable the user to access and/or interact with other systems in the environment 100. For example, the user device 105 may be a computer system such as, for example, a desktop computer, a mobile device, a tablet, etc. In some embodiments, the user device 105 may include one or more electronic application(s), e.g., a program, plugin, browser extension, etc., installed on a memory of the user device 105.

The user device 105 may include a display/user interface (UI) 105A, a processor 1058, a memory 105C, and/or a network interface 105D. The user device 105 may execute, by the processor 1058, an operating system (O/S) and at least one electronic application (each stored in memory 105C). The electronic application may be a desktop program, a browser program, a web client, or a mobile application program (which may also be a browser program in a mobile O/S), an applicant specific program, system control software, system monitoring software, software development tools, or the like. For example, environment 100 may extend information on a web client that may be accessed through a web browser. In some embodiments, the electronic application(s) may be associated with one or more of the other components in the environment 100. The application may manage the memory 105C, such as a database, to transmit streaming data to network 101. The display/UI 105A may be a touch screen or a display with other input systems (e.g., mouse, keyboard, headset, etc.) so that the user(s) may interact with the application and/or the O/S. The network interface 105D may be a TCP/IP network interface for, e.g., Ethernet or wireless communications with the network 101. The processor 1058, while executing the application, may generate data and/or receive user inputs from the display/UI 105A and/or receive/transmit messages to the server system 115, and may further perform one or more operations prior to providing an output to the network 101.

External systems 110 may be, for example, one or more third party and/or auxiliary systems that integrate and/or communicate with the server system 115 in performing various system tasks. For example, external systems 110 may be a part of a cloud system. External systems 110 may be in communication with other device(s) or system(s) in the environment 100 over the one or more networks 101. For example, external systems 110 may communicate with the server system 115 via API (application programming interface) access over the one or more networks 101, and also communicate with the user device(s) 105 via web browser access over the one or more networks 101.

In various embodiments, the network 101 may be a wide area network ("WAN"), a local area network ("LAN"), a personal area network ("PAN"), or the like. In some embodiments, network 101 includes the Internet, and information and data provided between various systems occurs online. "Online" may mean connecting to or accessing source data or information from a location remote from other devices or networks coupled to the Internet. Alternatively, "online" may refer to connecting or accessing a network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

The server system 115 may include an electronic data system, e.g., a computer-readable memory such as a hard drive, flash drive, disk, etc. In some embodiments, the server system 115 includes and/or interacts with an application programming interface for exchanging data to other systems, e.g., one or more of the other components of the environment.

The server system 115 may include a database 115A and at least one server 1158. The server system 115 may be a computer, system of computers (e.g., rack server(s)), and/or or a cloud service computer system. The server system may store or have access to database 115A (e.g., hosted on a third party server or in memory 115E). The server(s) may include a display/UI 115C, a processor 115D, a memory 115E, and/or a network interface 115F. The display/UI 115C may be a touch screen or a display with other input systems (e.g., mouse, keyboard, headset, etc.) for an operator of the server 1158 to control the functions of the server 1158. The server system 115 may execute, by the processor 115D, an operating system (O/S) and at least one instance of a servlet program (each stored in memory 115E).

Although depicted as separate components in FIG. 1, it should be understood that a component or portion of a component in the environment 100 may, in some embodiments, be integrated with or incorporated into one or more other components. For example, a portion of the display 115C may be integrated into the user device 105 or the like. In some embodiments, operations or aspects of one or more of the components discussed above may be distributed amongst one or more other components. Any suitable arrangement and/or integration of the various systems and devices of the environment 100 may be used.

Further aspects of securely deploying obfuscated modules in an external system are discussed in further detail in the methods below. In the following methods, various acts may be described as performed or executed by a component from FIG. 1, such as the server system 115, the user device 105, or components thereof. However, it should be understood that in various embodiments, various components of the environment 100 discussed below may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2:
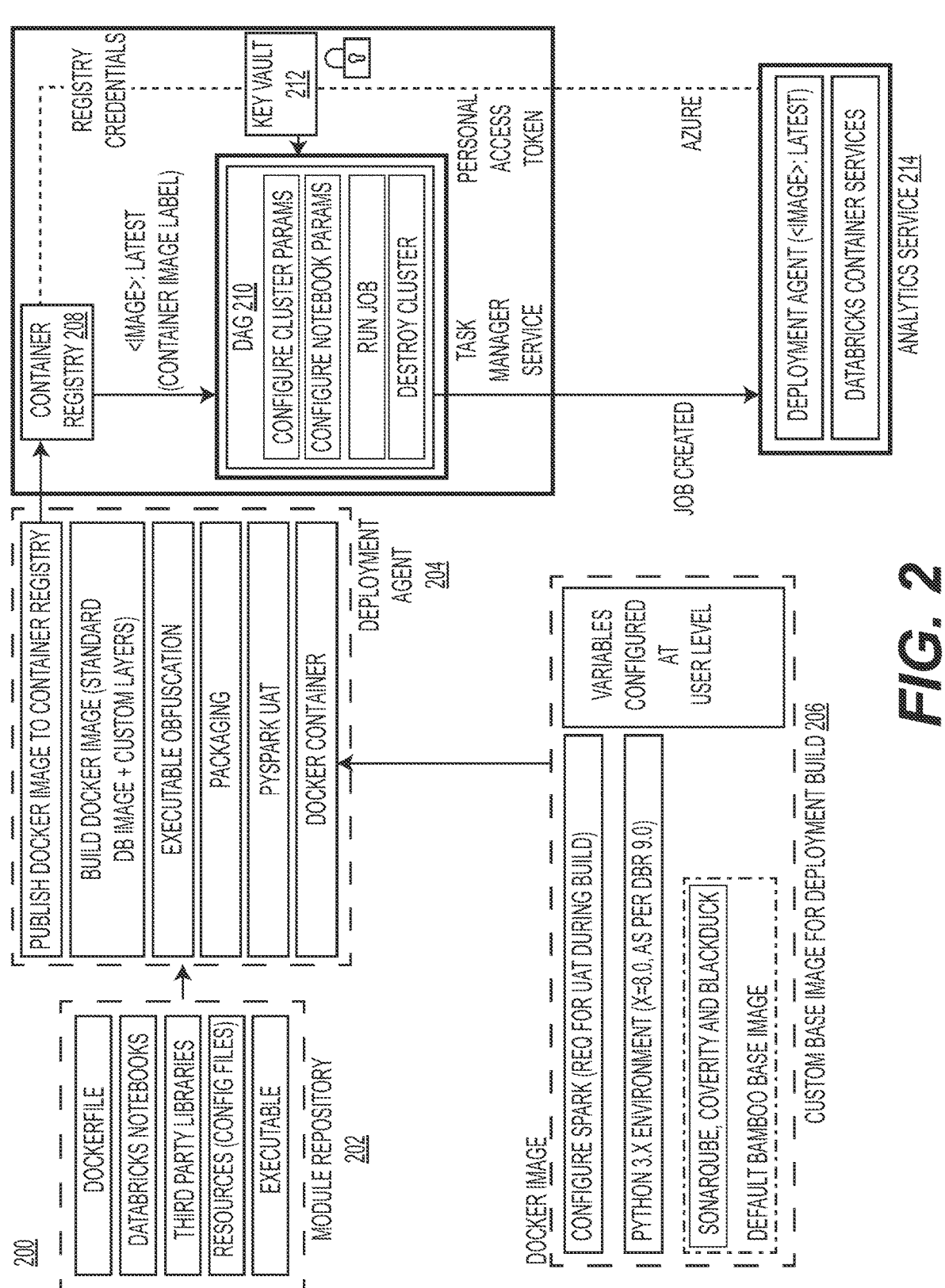
FIG. 2 depicts a flowchart of an exemplary system flow for creating and utilizing a container image, according to one or more embodiments.
Figure 3:
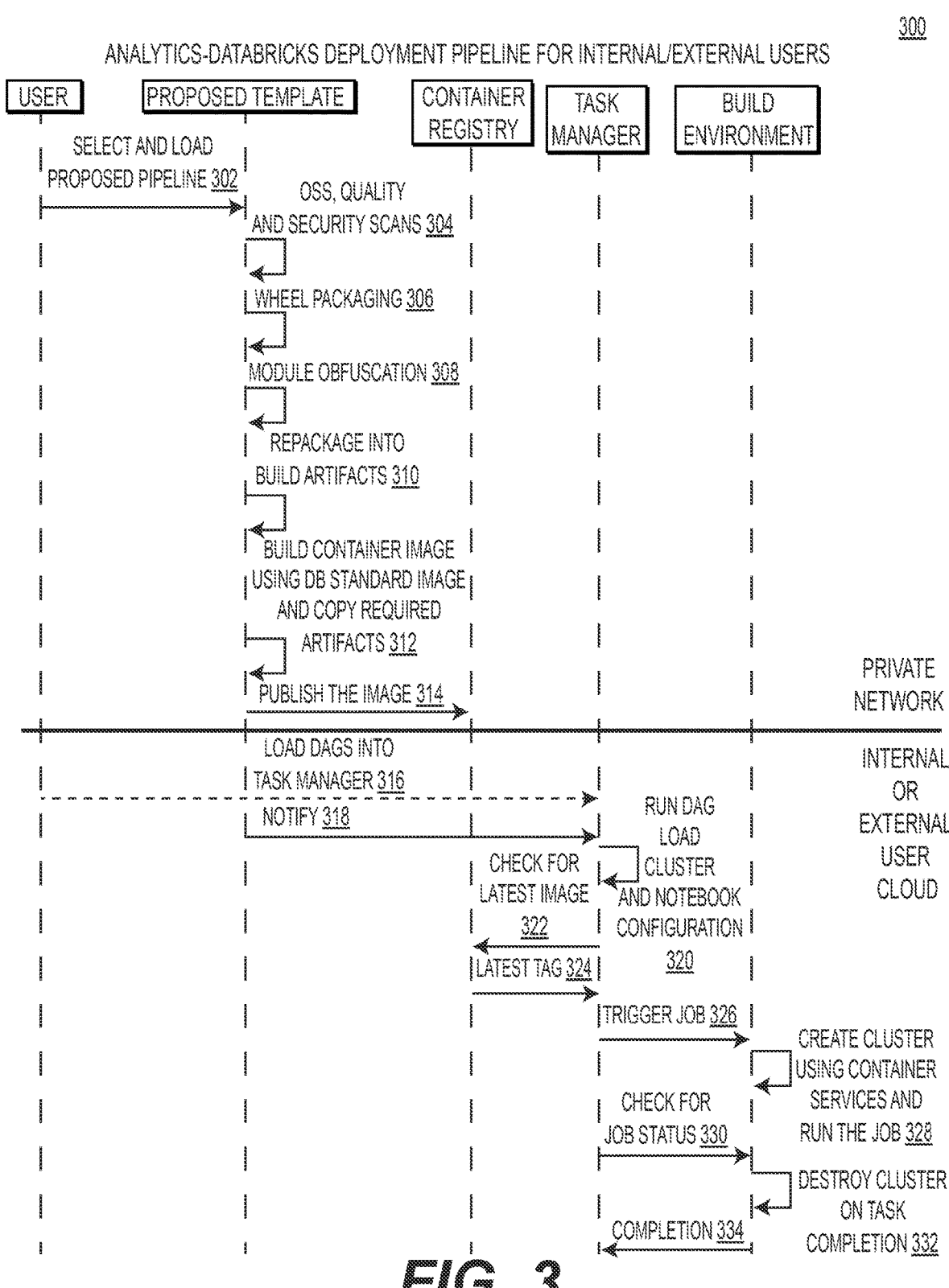
FIG. 3 depicts a flowchart for executing a pipeline, according to one or more embodiments.

In general, any process or operation discussed in this disclosure that is understood to be computer-implementable, such as the processes illustrated in FIGS. 2-4, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Exemplary System Flow for Creating and Utilizing a Container Image

FIG. 2 illustrates an exemplary process 200 for creating and utilizing a container image, according to one or more embodiments. Notably, process 200 may be performed by one or more processors of a server that is in communication with one or more user devices and other external system(s) via a network. However, it should be noted that process 200 may be performed by any one or more of the server, one or more user devices, or other external systems.

The exemplary process may include sending one or more modules from a module repository 202 to a deployment agent 204. The one or more modules may include at least one of: a command file (e.g., a DockerFile), one or more notebooks (e.g., Databricks Notebooks), third party libraries, resources (e.g., configuration files), and/or executables. The deployment agent 204 may include one or more transforming modules, such as a publish container image to container registry module, a build container image module, an executable obfuscation module, a packing module, and/or a user acceptance testing (UAT) module.

The exemplary process may also include sending a custom base image for a deployment build 206 to the deployment agent 204. The custom base image 206 may be associated with the one or more modules that were sent to the deployment agent 204. The custom base image 206 may include one or more custom environment modules. For example, the one or more environment modules may include one or more user level variables (e.g., variables configured at user level), one or more custom testing variables (e.g., configure spark), one or more custom environment modules (e.g., Python 3.X environment), or one or more custom security modules (e.g., SonarQube, Coverity, or Black-Duck). The custom base image 206 may include a set of default environment modules that may be overridden and/or modified by the one or more custom environment modules.

The exemplary process may also include the deployment agent 2040 transforming the one or more modules, based on the custom base image 206, into a container image. For example, the deployment agent 204 may perform a build, where the one or more modules are transformed based on the environment specified by the custom base image 206 into a container image. The deployment agent 204 may utilize the one or more transforming modules during the transforming process.

The exemplary process may also include publishing the container image into a container registry 208 of an external system. The container registry 208 may store the container image. The container registry 208 may also store a job and/or task identifier that corresponds to the container image, where the container image may accomplish the job and/or task when executed. The container registry 208 may also store the container image with a corresponding label and/or tag that indicates whether the container image is the latest version. Additionally, the external system may not be able to access the module repository 202, the deployment agent 204, and/or the custom base image 206 for the deployment build.

The exemplary process may also include a Directed Acyclic Graphs (DAG) 210 utilizing the container image from the container registry 208. The DAG 210 may include one or more tasks that should be executed by the external (or internal) system. The task manager service may run the DAG 210 to initiate one or more jobs and/or tasks. Running the DAG 210 may trigger the DAG 210 to configure one or more cluster parameters. The DAG 210 may also configure one or more entry point (e.g., notebook) parameters. The DAG 210 may then run the job and/or task, by running one or more container images. Upon completing the job and/or task, the DAG 210 may destroy the particular cluster instance, which may include the configured one or more cluster parameters, and/or the one or more notebook parameters. Upon completion of the job, the exemplary process may also include utilizing an analytics service 214, which may include the latest deployment agent and/or databricks container services.

The exemplary process may also include utilizing registry credentials, a key vault 212, and/or a personal access token to provide additional security in the external system.

Although FIG. 2 shows example blocks of exemplary process 200, in some implementations, the exemplary process 200 may include additional blocks, fewer blocks, different blocks, or differently arranged blocks than those depicted in FIG. 2. Additionally, or alternatively, two or more of the blocks of the exemplary process 200 may be performed in parallel.

Exemplary Process for Executing a Pipeline

FIG. 3 illustrates an exemplary process 300 for executing a pipeline, according to one or more embodiments. Notably, process 300 may be performed by one or more processors of a server that is in communication with one or more user devices and other external system(s) via a network. However, it should be noted that process 300 may be performed by any one or more of the server, one or more user devices, or other external systems.

The exemplary process may include a user selecting and loading a proposed pipeline 302. However, a system may automatically select and load the proposed pipeline. The pipeline may include one or more modules, where the modules may contain one or more executables. The proposed template may then perform open source (OSS), quality, and security scans on the loaded pipeline 304. The proposed template may then perform wheel packaging on the loaded pipeline 306. The proposed template may then perform module obfuscation on the loaded pipeline 308. The proposed template may then repackage the pipeline into build artifacts 310. The proposed template may then build a container image using a database (DB) standard image and may also copy required artifacts 312. The proposed template may then publish the container image to a container registry 314.

The exemplary process may include a user (or the system) loading Directed Acyclic Graphs (DAG) into the task manager 316. For example, the DAG may include one or more tasks that should be executed by an external (or internal)

system, such as a cloud system. The proposed template may then notify the task manager of the loaded DAGs 318. The task manager may run the DAG, which may result in loading one or more clusters and one or more entry point (e.g., notebook) configurations 320. The task manager may check the container registry for the latest version of the container image 322. The container registry may then send a latest tag, which may correspond to the latest version of the container image, to the task manager 324. The task manager may then trigger one or more jobs, where each of the jobs may include one or more tasks 326.

The exemplary process may also include the build environment creating a cluster using container services and then running the job 328. The container registry may then check the job status to see if the job has been completed, or if there are any outstanding tasks to run 330. Once all of the tasks has been completed, the build environment may then destroy the cluster 332. The build environment may then notify the task manager of the completion of the job 334.

Although FIG. 3 shows example blocks of exemplary process 300, in some implementations, the exemplary process 300 may include additional blocks, fewer blocks, different blocks, or differently arranged blocks than those depicted in FIG. 3. Additionally, or alternatively, two or more of the blocks of the exemplary process 300 may be performed in parallel.

Exemplary Method for Securely Deploying Obfuscated Modules

FIG. 4 illustrates an exemplary method 400 for securely deploying obfuscated executable modules in an external system, according to one or more embodiments. Notably, method 400 may be performed by one or more processors of a server that is in communication with one or more user devices and other external system(s) via a network. However, it should be noted that method 400 may be performed by any one or more of the server, one or more user devices, or other external systems.

The method may include selecting, by one or more processors, one or more modules from a module repository, the one or more modules associated with completing a task (Step 402). The one or more modules may be selected from a module repository in order to complete a task. In some embodiments, the selecting may be automated, where each task is mapped to the one or more modules that will complete the task. In some embodiments, the selecting may be manual, where a user may manually select the one or more modules to complete the task. The module repository may store some or all of the one or more modules. In some embodiments, the module repository may communicate with one or more other repositories that store some or all of the one or more modules.

The one or more modules may include one or more resource modules, one or more third party library modules, one or more command modules, one or more interface modules, or one or more execution modules. The one or more resource modules may include parameters, options, settings, and/or preferences applied to the system environment. The one or more third party library modules may include components created by a third party. The one or more command modules may include commands used to complete the task. For example, the one or more command modules may include instructions regarding how to complete the task. The one or more interface modules may include one or more interfaces that contain executables, visualizations, and/or narrative text. The one or more execution modules may include executables that interact with different components of the computing system to complete the task.

The method may further include receiving, by the one or more processors, a custom base image, the custom base image including one or more environment modules configured to provide a specific execution environment for the one or more modules (Step 404). The custom base image may configure one or more default environment modules to address any potential compatibility issues. The custom base image may correspond to an environment that includes customized modules, such as the one or more environment modules, to execute the one or more modules. In some embodiments, the custom base image may correspond to the task, where the custom base image may be received in response to sending a notification identifying the task. In some embodiments, the custom base image may be associated with at least one of the one or more modules, where the custom base image may be automatically received in response to the selection of the modules. The one or more environment modules may include one or more user level variables, one or more custom testing variables, one or more custom environment modules, or one or more custom security modules.

The method may further include transforming, by the one or more processors, based on the custom base image, the one or more modules into a container image, the transforming including performing at least one obfuscation action on the one or more modules (Step 406). The transforming may include a build process that converts the one or more modules into a container image that includes executable modules. Additionally, the one or more modules may be transformed based on the custom base image, where the one or more environment modules may be utilized during the transforming. For example, the system may have default one or more environment modules that are a part of the execution environment. The custom base image may allow for the customization of the execution environment, where the one or more environment modules may override (or modify) the default one or more environment modules. Additionally, for example, the transforming may include executing at least one user acceptance test on the one or more modules, where the testing may occur before the container image is accessible by the external system. In some embodiments, the transforming may result in the creation of a container image identifier that may be associated with the container image. Additionally, the container image identifier may be a unique identifier that may be used to invoke the container image. In some embodiments, the at least one obfuscation action may utilize at least one unique key.

In some embodiments, performing the at least one obfuscation action may further include determining, by the one or more processors, at least one environment module requirement of the one or more modules, and analyzing, by the one or more processors, the one or more environment modules to determine that at least one of the one or more environment modules include the at least one environment module requirement. The at least one environment module requirement may indicate environment module values that may need to be included in the execution environment to support the one or more modules. Additionally, the at least one environment module requirement may correspond to a particular version, parameter values, artifacts, and the like of the one or more modules.

In some embodiments, the transforming may include associating, by the one or more processors, the container image with a task identifier, wherein the task identifier is associated with the task. For example, each task may have one or more associated task identifiers. The container image may be associated with the task identifier, where the container image may be invoked (e.g., via a container repository) by using a task identifier.

In some embodiments, the transforming may include utilizing, by the one or more processors, one or more encrypted variables. For example, the encrypted variables may be utilized before the container image is accessible by an external system. Additionally, for example, an external system may be unable to access the one or more encrypted variables.

The method may further include publishing, by the one or more processors, the container image and a container image identifier to the external system, the external system configured to execute a cluster instance corresponding to the task, the cluster instance comprising at least one of: the container image identifier, one or more environmental parameters indicative of an environment to execute the container image, and one or more entry point parameters indicative of an initial configuration for executing the container image (Step 408). The one or more entry point parameters may include, for example, a user name and a password. In some embodiments, the cluster instance may be mapped to the one or more entry point parameters. Additionally, for example, executing the cluster instance may include retrieving and executing the container image corresponding to the container image identifier from the container registry. In some embodiments, the external system may be further configured to destroy the cluster instance so that the cluster instance is removed from the external system.

The publishing the container image and a container image identifier may include storing the container image and/or the container image identifier in the container registry. In some embodiments, the method may include sending a request to the container registry with the container image identifier. In response to receiving the request, the container registry may make the container image available. For example, a component of the external system may send a request to the container registry, where the request may include the container image identifier. The container registry may then select the container image that corresponds to the container image identifier, and then send the container image to the requesting component of the external system.

The external system may correspond to one or more systems that are external to the system that performed the transforming of the one or more modules into a container image. In some embodiments, the external system may be the same system that performed the transforming. In other embodiments, the external system may be internal to the system that performed the transforming.

The external system may be configured to execute a cluster instance corresponding to the task. The cluster instance may be a particular instance of a cluster. For example, a cluster instance may include one or more custom parameters, where each cluster instance may correspond to the same cluster, but may include different custom parameters. The external system may want to complete one or more tasks. Additionally, each task may have a corresponding cluster instance, which, when executed, completes the corresponding task. For example, the cluster instance may include the container image identifier, one or more environmental parameters, and one or more entry point parameters. In some embodiments, there may be multiple cluster instances that may complete a job (e.g., multiple tasks). The cluster instance may include the container image and parameters for the environment to execute the container image to complete the particular task. In some embodiments, the one or more environmental parameters may override default environmental parameters of the existing system. For example, an environmental parameter may correspond to a different version of an application that already exists as a default environmental parameter.

The external system may also be configured to destroy the cluster instance so that the cluster instance is removed from the external system. For example, after the cluster instance has been executed, and the task has been completed, the external system may destroy the cluster instance. Additionally, destroying the cluster instance may result in the removal of the cluster instance, but not the removal of the cluster. Destroying the cluster instance may increase the external system's efficiency because the external system may act in a dynamic manner, where the external system executes the cluster instances for the tasks that may be executed at a particular time. As a result, the external system may avoid supporting the load of a cluster instance that is no longer needed.

Although FIG. 4 shows example blocks of exemplary method 400, in some implementations, the exemplary method 400 may include additional blocks, fewer blocks, different blocks, or differently arranged blocks than those depicted in FIG. 4. Additionally, or alternatively, two or more of the blocks of the exemplary method 400 may be performed in parallel.

Exemplary Device

Figure 5:
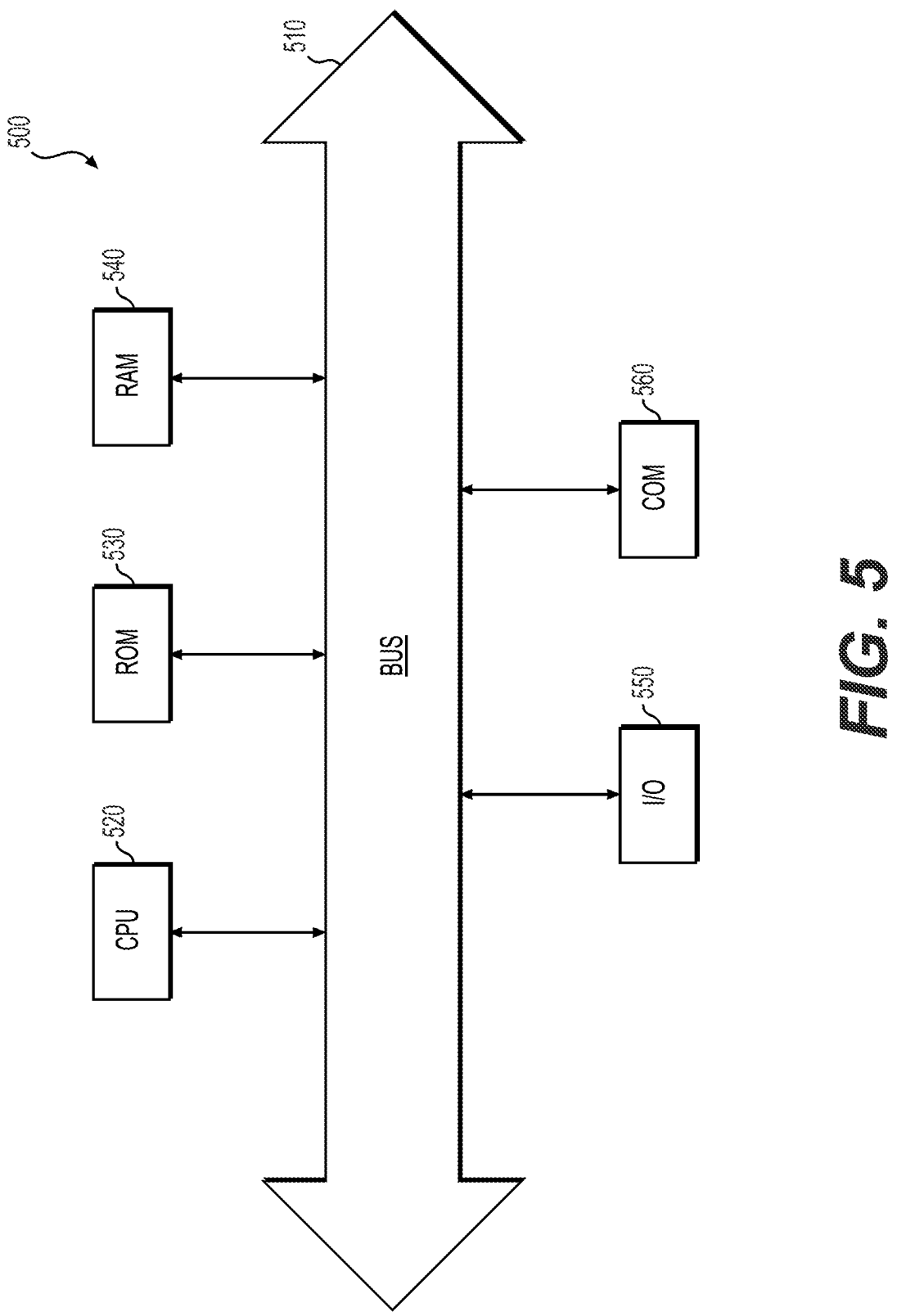
FIG. 5 depicts an example system that may execute techniques presented herein.

FIG. 5 is a simplified functional block diagram of a computer 500 that may be configured as a device for executing the methods of FIGS. 2-4, according to exemplary embodiments of the present disclosure. For example, device 500 may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multiprocessor system, such system operating alone, or in a cluster of computing devices operating in a cluster or server farm. CPU 520 may be connected to a data communication infrastructure 510, for example, a bus, message queue, network, or multi-core message-passing scheme.

Device 500 also may include a main memory 540, for example, random access memory (RAM), and also may include a secondary memory 530. Secondary memory 530, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into device 500. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 500.

Device 500 also may include a communications interface ("COM") 560. Communications interface 560 allows software and data to be transferred between device 500 and external devices. Communications interface 560 may include a modem, a network interface (such as an Ethernet card), a communications port, a PCMCIA slot and card, or the like. Software and data transferred via communications interface 560 may be in the form of signals, which may be electronic, electromagnetic, optical, or other signals capable of being received by communications interface 560. These signals may be provided to communications interface 560 via a communications path of device 500, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for securely deploying obfuscated modules in an external system, the method comprising:

selecting, by one or more processors of one or more servers in communication with the external system via a network, one or more modules from a module repository, the one or more modules associated with completing a task;

sending, by the one or more processors, a custom base image for a deployment build to a deployment agent, wherein the deployment agent comprises one or more transforming modules;

automatically receiving, by the deployment agent, the custom base image, the custom base image including one or more custom environment modules configured to provide a specific execution environment for the one or more modules, wherein the one or more custom environment modules override default environment modules of the execution environment;

transforming, by the deployment agent using the one or more transforming modules, based on the custom base image, the one or more modules into a container image, the transforming including performing at least one obfuscation action on the one or more modules, wherein the performing of the at least one obfuscation action comprises determination of one or more environment module values to include in the execution environment to support the one or more modules, and wherein the external system is prevented from accessing the module repository, the deployment agent, and the custom base image used for the deployment build, wherein all processes until transforming the one or more modules into the container image are performed within a private network; and publishing, by the one or more processors, the container image and a container image identifier to the external system, wherein the external system is in communication with the execution environment via the network, the external system configured to execute a cluster instance corresponding to the task, the cluster instance comprising at least one of: the container image identifier, one or more environmental parameters indicative of an environment to execute the container image, and one or more entry point parameters indicative of an initial configuration for executing the container image.

2. The computer-implemented method of claim 1, wherein executing the cluster instance includes retrieving and executing the container image corresponding to the container image identifier from a container registry.

3. The computer-implemented method of claim 1, wherein performing the at least one obfuscation action further includes:

determining, by the one or more processors, at least one environment module requirement of the one or more modules; and analyzing, by the one or more processors, the one or more environment modules to determine that at least one of the one or more environment modules include the at least one environment module requirement.

4. The computer-implemented method of claim 1, the transforming including executing at least one user acceptance test on the one or more modules.

5. The computer-implemented method of claim 1, the transforming including:

associating, by the one or more processors, the container image with a task identifier, wherein the task identifier is associated with the task; and utilizing, by the one or more processors, one or more encrypted variables.

6. The computer-implemented method of claim 1, wherein the one or more modules include one or more resource modules indicating one or more settings to be applied to the environment, one or more third party library modules that include one or more components created by a third party, one or more command modules that include one or more task instructions for how to complete a task, one or more interface modules that include one or more interfaces for visualizing text, or one or more execution modules for interacting with one or more system components for completing the task.

7. The computer-implemented method of claim 1, wherein the one or more environment modules includes one or more user level variables indicating variables created by a user, one or more custom testing variables indicating variables for performing testing of the custom base image, one or more custom environment modules for executing the custom base image, or one or more custom security modules for protecting the custom base image.

8. The computer-implemented method of claim 1, wherein the at least one obfuscation action utilizes at least one unique key.

9. The computer-implemented method of claim 1, wherein upon execution of the task, the external system is further configured to destroy the cluster instance so that the cluster instance is removed from the external system.

10. A computer system for securely deploying obfuscated modules in an external system, the computer system comprising:

a memory having processor-readable instructions stored therein; and one or more processors of one or more servers in communication with the external system via a network, wherein the one or more processors are configured to access the memory and execute the processor-readable instructions, which when executed by the one or more processors configures the one or more processors to perform a plurality of functions, including functions for:

selecting one or more modules from a module repository, the one or more modules associated with completing a task;

sending a custom base image for a deployment build to a deployment agent, wherein the deployment agent comprises one or more transforming modules;

automatically receiving, by the deployment agent the custom base image, the custom base image including one or more custom environment modules configured to provide a specific execution environment for the one or more modules, wherein the one or more custom environment modules override default environment modules of the execution environment;

transforming, by the deployment agent using the one or more transforming modules, based on the custom base image, the one or more modules into a container image, the transforming including performing at least one obfuscation action on the one or more modules, wherein the performing of the at least one obfuscation action comprises determination of one or more environment module values to include in the execution environment to support the one or more modules, and wherein the external system is prevented from accessing the module repository, the deployment agent, and the custom base image used for the deployment build, wherein all processes until transforming the one or more modules into the container image are performed within a private network; and publishing the container image and a container image identifier to the external system, wherein the external system is in communication with the execution environment via the network, the external system configured to execute a cluster instance corresponding to the task, the cluster instance comprising at least one of: the container image identifier, one or more environmental parameters indicative of an environment to execute the container image, and one or more entry point parameters indicative of an initial configuration for executing the container image.

11. The computer system of claim 10, wherein executing the cluster instance includes retrieving and executing the container image corresponding to the container image identifier from a container registry.

12. The computer system of claim 10, wherein performing the at least one obfuscation action further includes:

determining at least one environment module requirement of the one or more modules; and analyzing the one or more environment modules to determine that at least one of the one or more environment modules include the at least one environment module requirement.

13. The computer system of claim 10, the transforming including executing at least one user acceptance test on the one or more modules.

14. The computer system of claim 10, the transforming including:

associating the container image with a task identifier, wherein the task identifier is associated with the task.

15. The computer system of claim 10, wherein upon execution of the task, the external system is further configured to destroy the cluster instance so that the cluster instance is removed from the external system.

16. The computer system of claim 10, wherein the one or more modules include one or more resource modules indicating one or more settings to be applied to the environment, one or more third party library modules that include one or more components created by a third party, one or more command modules that include one or more task instructions for how to complete a task, one or more interface modules that include one or more interfaces for visualizing text, or one or more execution modules for interacting with one or more system components for completing the task.

17. A non-transitory computer-readable medium containing instructions for securely deploying obfuscated modules in an external system, the instructions comprising:

selecting one or more modules from a module repository, the one or more modules associated with completing a task;

sending a custom base image for a deployment build to a deployment agent, wherein the deployment agent comprises one or more transforming modules;

automatically receiving, by the deployment agent the custom base image, the custom base image including one or more custom environment modules configured to provide a specific execution environment for the one or more modules, wherein the one or more custom environment modules override default environment modules of the execution environment;

transforming, by the deployment agent using the one or more transforming modules, based on the custom base image, the one or more modules into a container image, the transforming including performing at least one obfuscation action on the one or more modules, wherein the performing of the at least one obfuscation action comprises determination of one or more environment module values to include in the execution environment to support the one or more modules, and wherein the external system is prevented from accessing the module repository, the deployment agent, and the custom base image used for the deployment build, wherein all processes until transforming the one or more modules into the container image are performed within a private network; and publishing the container image and a container image identifier to the external system wherein the external system is in communication with the execution environment via the network, the external system configured to execute a cluster instance corresponding to the task, the cluster instance comprising at least one of: the container image identifier, one or more environmental parameters indicative of an environment to execute the container image, and one or more entry point parameters indicative of an initial configuration for executing the container image.

18. The non-transitory computer-readable medium of claim 17, wherein the one or more modules include one or more resource modules indicating one or more settings to be applied to the environment, one or more third party library modules that include one or more components created by a third party, one or more command modules that include one or more task instructions for how to complete a task, one or more interface modules that include one or more interfaces for visualizing text, or one or more execution modules for interacting with one or more system components for completing the task.

19. The non-transitory computer-readable medium of claim 17, wherein the one or more environment modules includes one or more user level variables indicating variables created by a user, one or more custom testing variables indicating variables for performing testing of the custom base image, one or more custom environment modules for executing the custom base image, or one or more custom security modules for protecting the custom base image.

20. The non-transitory computer-readable medium of claim 17, wherein upon execution of the task, the external system is further configured to destroy the cluster instance so that the cluster instance is removed from the external system.

\* \* \* \* \*